(12) United States Patent
Kushner et al.

(10) Patent No.: US 11,176,334 B1
(45) Date of Patent: Nov. 16, 2021

(54) CARDHOLDER SLEEVE AND NEAR-FIELD COMMUNICATION PROXY DEVICE FOR COMMUNICATION WITH INTEGRATED CIRCUIT CHIP CARDS

(71) Applicant: Wells Fargo Bank, N.A., San Francisco, CA (US)

(72) Inventors: Kristine Ing Kushner, Orinda, CA (US); John T. Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/654,649

(22) Filed: Oct. 16, 2019

(51) Int. Cl.
*G06K 7/06* (2006.01)
*G06K 7/10* (2006.01)
(Continued)

(52) U.S. Cl.
CPC ........... *G06K 7/065* (2013.01); *G06K 7/0056* (2013.01); *G06K 7/10297* (2013.01);
(Continued)

(58) Field of Classification Search
CPC .............. G06Q 20/322; G06Q 20/327; G06Q 20/3278; G06Q 20/341; G06Q 20/353; G06Q 20/36; G06Q 20/367; G07F 7/0873; G07F 7/0886; G07F 7/0893; G06K 7/0056; G06K 7/006; G06K 7/0073; G06K 7/0086; G06K 7/0091
(Continued)

(56) References Cited

U.S. PATENT DOCUMENTS 6,128,604 A 10/2000 Sakamaki et al.
6,155,410 A 12/2000 Davis
(Continued)

FOREIGN PATENT DOCUMENTS

CN 202476717 U 10/2012
CN 107784497 A 3/2018
GB 2528316 1/2016

OTHER PUBLICATIONS

Silbert, S., "Pay with Your Pebble Watch with This Smartstrap—A Third-Party Accessory Brings Mobile Payments to Three Pebble Devices", Lifewire, Sep. 5, 2018, 2 pages.
(Continued)

*Primary Examiner* — Suezu Ellis
(74) *Attorney, Agent, or Firm* — Shumaker & Sieffert, P.A.

(57) ABSTRACT

A cardholder sleeve and a computing device paired with the cardholder sleeve configured to operate as near-field communication (NFC) proxy devices for one or more integrated circuit (IC) chip cards held in the cardholder sleeve is disclosed. The cardholder sleeve includes at least one pocket to hold an IC chip card and at least one internal card reader adjacent to each pocket, and is configured to wirelessly pair with the computing device via a wireless communication protocol. When the computing device comes in close proximity to an external card reader, the NFC interrogation occurs with the computing device acting as a proxy for the card held in the cardholder sleeve. In this way, the cardholder sleeve and computing device form a repeater network that enables the card to be interrogated remotely on a per-transaction basis.

20 Claims, 7 Drawing Sheets

(51) Int. Cl.
*G06K 7/00* (2006.01)
*G06Q 20/32* (2012.01)
*G07F 7/08* (2006.01)
*G06Q 20/34* (2012.01)

(52) U.S. Cl.
CPC ....... *G06Q 20/3278* (2013.01); *G06Q 20/353* (2013.01); *G07F 7/0873* (2013.01); *G07F 7/0893* (2013.01)

(58) Field of Classification Search
USPC .................................................. 235/441, 486
See application file for complete search history.

(56) References Cited

U.S. PATENT DOCUMENTS

| | | |
|---|---|---|
| 6,336,586 B1 | 1/2002 | Shriver |
| 7,980,458 B2 | 7/2011 | Kon et al. |
| 9,192,217 B1 | 11/2015 | Vargas |
| 9,256,768 B2 | 2/2016 | Gluck |
| 9,344,154 B2 | 5/2016 | Wndling et al. |
| 9,779,398 B2 | 10/2017 | Peterson et al. |
| 9,907,375 B1 | 3/2018 | Kitchen |
| 10,185,955 B1 | 1/2019 | Koeppel et al. |
| 2009/0039121 A1* | 2/2009 | Paul .......................... A45F 5/00 224/222 |
| 2012/0239514 A1* | 9/2012 | MacGillivray .... G06Q 20/3278 705/16 |
| 2013/0317924 A1* | 11/2013 | Bush .................. G06Q 20/3278 705/16 |
| 2013/0325712 A1 | 12/2013 | Park et al. |
| 2017/0011381 A1 | 1/2017 | Silvestre et al. |
| 2018/0158048 A1* | 6/2018 | Narasimhan ........... G06Q 40/00 |
| 2019/0066089 A1 | 2/2019 | Miryala et al. |
| 2019/0102766 A1* | 4/2019 | Koeppel ............... G06Q 20/352 |
| 2020/0210994 A1* | 7/2020 | Sauer .................... G06Q 20/353 |

OTHER PUBLICATIONS

Majumder, A. et al., "Pay-Cloak: A Biometric Back Cover for Smartphones Facilitating secure contactless payments and identity virtualization at low cost to end users." IEEE Consumer Electronics Magazine, Mar. 15, 2017, 11 pages.
Luthi, B. "As credit cards go contactless, can RFID-blocking wallets protect your data?" Retrieved from https://www.creditcards.com/credit-card-news/rfidblocking-wallet-worth-it/., Apr. 9, 2019, 4 pages.
U.S. Appl. No. 16/578,110, filed Sep. 20, 2019, naming inventors Wright et al.

* cited by examiner

CARDHOLDER SLEEVE AND NEAR-FIELD COMMUNICATION PROXY DEVICE FOR COMMUNICATION WITH INTEGRATED CIRCUIT CHIP CARDS

TECHNICAL FIELD

The invention relates to integrated circuit chip card near-field communications and methods for securing the same.

BACKGROUND

Credit cards have long provided cardholders with a convenient payment option at a majority of merchants. Credit cards include unique information that links the card to a cardholder's account with a financial institution (e.g., a bank or a non-bank card issuer). For example, in the case of a traditional credit card, the account may comprise an amount of credit available to the cardholder, or in the case of a debit card, the account may comprise a checking or savings account that belongs to the cardholder. Credit cards typically include the cardholder's name, the account number, an expiration date, and a card security code (CSC) (alternatively referred to as a card verification value (CVV) or card verification code (CVC)) printed or embossed on the physical card.

Credit cards may also include a magnetic stripe or an integrated circuit (IC) that is attached to the physical card and encoded with the unique information. In the case of a chip-enabled card, the IC embedded on the card may be configured to store additional information and/or perform processing tasks that exceed the capabilities of a magnetic stripe. For example, a single chip-enabled card may be programmed with multiple financial account credentials, insurance information, and personal identification information. Some chip-enabled cards may use a personal identification number (PIN) and/or cryptographic algorithms to authenticate a user or a transaction. In some examples, these chip-enabled cards may comprise contact cards that include a pattern of metal contacts to electronically connect (e.g., couple) a card reader to the IC when the contact card is physically inserted into the card reader. In other examples, these chip-enabled cards may comprise contactless cards that wirelessly transmit financial data via one or more antennas embedded on the card. For example, the contactless cards may transmit the financial data via a short-range antenna or a long-range antenna on the card. Other examples of contactless cards include transit cards or employee badges that store information on the IC for access to transit stops, vehicles, facilities, or any other area that requires particular access rights.

SUMMARY

In general, this disclosure describes a cardholder sleeve and a computing device paired with the cardholder sleeve configured to operate as a near-field communication (NFC) proxy device for one or more integrated circuit (IC) chip cards held in the cardholder sleeve. The cardholder sleeve and proxy device described in this disclosure may increase the security and general ease of use of IC chip cards included within the cardholder sleeve.

The cardholder sleeve includes at least one pocket to hold an IC chip card with at least one internal card reader adjacent to each pocket, and an external transceiver configured to wirelessly pair with the computing device via a wireless communication protocol. The IC chip card may comprise a contact or contactless credit, debit and/or transit card. In some examples, the at least one internal card reader comprises a contactless card reader configured to perform NFC or other short-range communication with the IC embedded in the contactless card held in the pocket of the cardholder sleeve. In other examples, the at least one internal card reader comprises a contact card reader configured to come in contact with a pattern of metal contacts on the contact card to electronically couple the internal card reader to the IC embedded in the contact card held in the pocket of the cardholder sleeve.

The computing device configured to operate as an NFC proxy device, in accordance with techniques of this disclosure, may be a smartphone, tablet, watch, ring, electronic tattoo, or any other device that includes NFC or other wireless communication capabilities to communicate with both an external card reader, such as a point-of-sale (POS) device, and the external transceiver of the cardholder sleeve. In one example, the computing device pair with the cardholder sleeve using a first longer-range communication protocol (e.g., Bluetooth or Wi-Fi) and communicate with the external card reader via a second shorter-range protocol (e.g., NFC). In this way, the longer operation range of the first communication protocol enables information to be communicated between the cardholder sleeve and the computing device without having to take the IC chip card out of cardholder sleeve or without even having to remove the cardholder sleeve from the user's pocket, bag, purse, etc. to perform transactions with an external card reader.

When the computing device comes in close proximity to the external card reader or point-of-sale (POS) system or when a user taps the paired computing device at the external card reader or POS system, the NFC interrogation occurs with the computing device acting as a proxy for the card held in the cardholder sleeve. In this way, the cardholder sleeve and computing device form a repeater network that enables the card to be interrogated remotely on a per-transaction basis. In the scenario where the IC chip card is a contact card, the repeater network may enable information read from the contact card held in the cardholder sleeve to be wirelessly communicated to the external card reader via the computing device operating as an NFC proxy device, essentially enabling the contact card to be used as a contactless card without having to remove the contact card from the cardholder sleeve. Reading the card information for each transaction may provide several advantages over using card information that is stored on the computing device, including reduced memory requirements and enhanced security.

In one example, this disclosure is directed to a system including a cardholder sleeve comprising a pocket and an internal card reader positioned adjacent to the pocket, wherein the pocket is configured to hold a card with an integrated circuit (IC) chip; and a computing device paired with the cardholder sleeve, wherein the computing device is configured to: receive an interrogating signal from an external card reader to perform a transaction, in response to receiving the interrogating signal, transmit a request to the cardholder sleeve paired with the computing device for information associated with the card held in the pocket of the cardholder sleeve, in response to the request, receive the information associated with the card from the cardholder sleeve, wherein the information is read from the IC chip of the card held in the pocket of the cardholder sleeve by the internal card reader, and in response to receiving the information from the cardholder sleeve, send the information associated with the card to the external card reader to complete the transaction.

In another example, this disclosure is directed to a method including receiving, at computing device paired with a cardholder sleeve comprising a pocket to hold a card with an integrated circuit (IC) chip and an internal card reader positioned adjacent to the pocket, an interrogating signal from an external card reader to perform a transaction; in response to receiving the interrogating signal, transmitting, by the computing device, a request to the cardholder sleeve for information associated with the card held in the pocket of the cardholder sleeve; in response to the request, receiving, at the computing device, the information associated with the card from the cardholder sleeve, wherein the information is read from the IC chip of the card held in the pocket of the cardholder sleeve by the internal card reader; and in response to receiving the information from the cardholder sleeve, sending, by the computing device, the information associated with the card to the external card reader to complete the transaction.

In another example, this disclosure is directed to cardholder sleeve comprising: a pocket to hold a card with an integrated circuit (IC) chip; an internal card reader positioned adjacent to the pocket; and a transceiver in communication with the internal card reader, wherein the transceiver is configured to receive a request for information associated with the card from a computing device paired with the cardholder sleeve over a first communication protocol, wherein, in response to the request for information received by the transceiver, the internal card reader is activated to read the information from the IC chip of the card held in the pocket via a second communication protocol, and wherein the transceiver is further configured to transmit the information associated with the card to the computing device over the first communication protocol.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
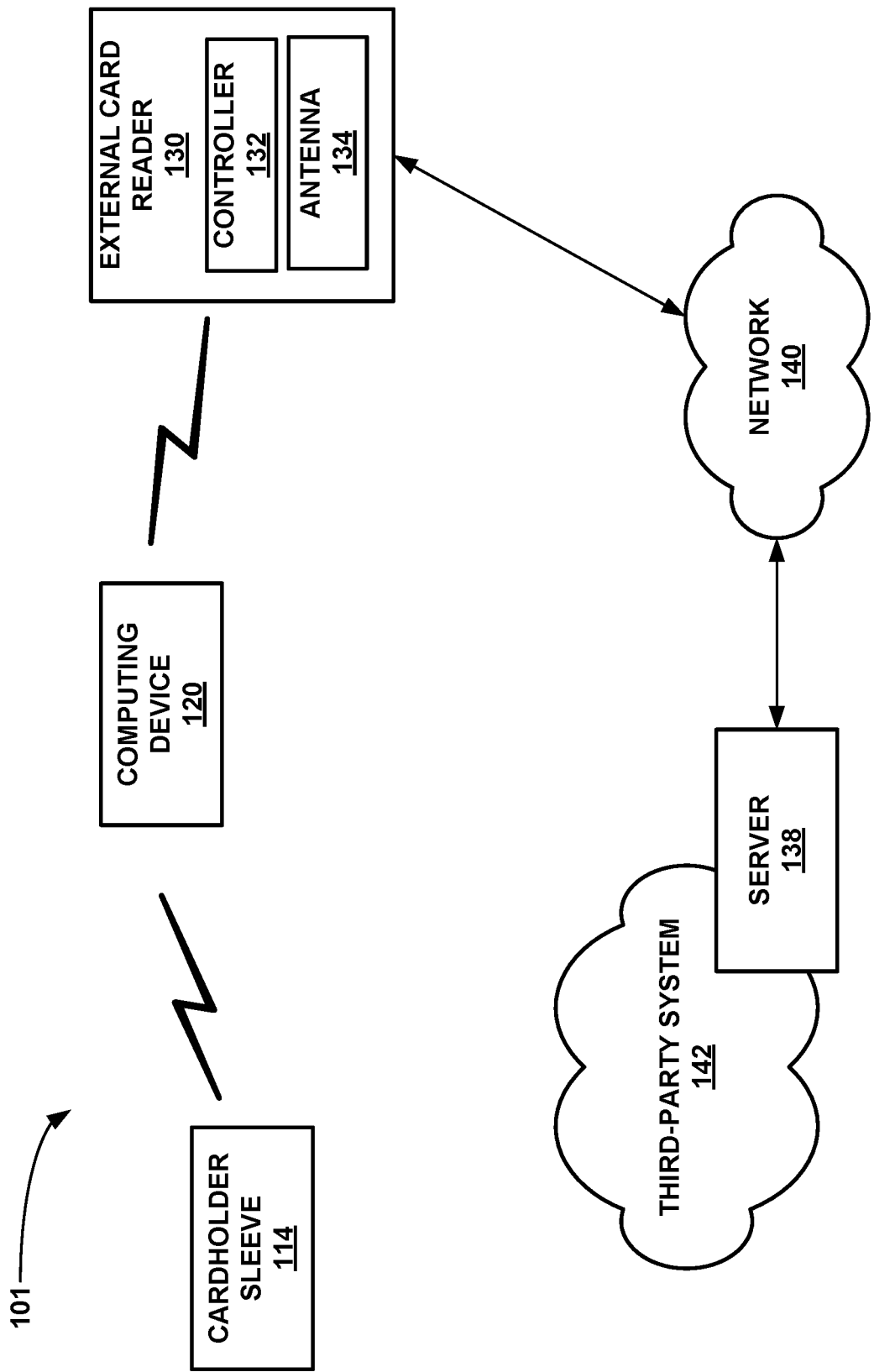
FIG. 1 is a block diagram illustrating a system that includes a cardholder sleeve, a computing device paired with the cardholder sleeve, and an external card reader, in accordance with the techniques of this disclosure.

Aspects of the disclosure are related to a cardholder sleeve and a computing device paired with the cardholder sleeve configured to operate as near-field communication (NFC) proxy devices for one or more integrated circuit (IC) chip cards held in the cardholder sleeve. The proxy devices described in this disclosure may increase the security and general ease of use of cards that store data on one or more integrated chips housed within the cards.

The cardholder sleeve includes at least one pocket to hold an IC chip card and at least one internal card reader adjacent to each pocket, and is configured to wirelessly pair with the computing device via a wireless communication protocol (e.g., Bluetooth, Wi-Fi, ZigBee). IC chip cards may be programmed with financial account(s) information, insurance information, personal identification information, and/or configured to perform processing tasks that exceed the capabilities of a magnetic stripe.

In some examples, IC chip cards may comprise contact cards that include a pattern of metal contacts to electronically connect (e.g., couple) a card reader to the IC when the contact card is physically inserted into the card reader. In some examples, contact cards use a personal identification number (PIN) and/or cryptographic algorithms to authenticate a user or a transaction. Example contact cards include identification cards (e.g., passports), financial cards (e.g., debit and credit cards), subscriber identity module (SIM) cards, or access cards such as transit cards or employee badges that store information on the IC for access to transit stops, vehicles, facilities, or any other area that requires particular access rights.

IC chip cards may also comprise contactless cards that wirelessly transmit financial and/or other data via one or more antennas embedded on the card. For example, the contactless cards may transmit financial data via a short-range antenna or a long-range antenna on the card to enable a user of the card (hereinafter referred to as a cardholder) to complete a financial transaction without having to physically swipe the card or even take the card out of a wallet. For example, the card may be used to complete a financial transaction by orienting the card within a certain proximity of or tapping the card on an external card reader of a merchant device (e.g., a point-of-sale (POS) device used by a merchant to execute and record transactions). The merchant device may be able to remotely activate and draw information from the card when the antenna of the card is properly oriented relative to the merchant device using NFC or other short-range communication protocols. Like contact cards, contactless cards may use a PIN and/or cryptographic algorithms to authenticate a user or a transaction. Other examples of contactless cards include transit cards, employee badges, or any other card that could otherwise be implemented with a magnetic stripe or a contact IC.

According to the disclosed techniques, the computing device may be a wearable device such as a ring, a watch, a bracelet, an electronic tattoo, etc. The computing device may also be a mobile device such as a smart phone, tablet, smart watch, or any other hand-held device. In some examples, the computing device may be a generic chip card that holds no information of its own. Either way, the computing device includes a wireless transceiver and antenna that can communicate with a wireless transceiver and antenna of the cardholder sleeve over a first communication protocol (e.g., via Bluetooth, Wi-Fi, ZigBee, etc.) and a short-range communication transceiver that can communicate with an external card reader or POS device over a second communication protocol (e.g., NFC).

Together, the cardholder sleeve and the computing device form a repeater network that enables the IC chip card held in the cardholder sleeve to be in communication with the POS system without requiring the user to remove the IC chip card or the cardholder sleeve from their pocket, wallet, purse, etc. (e.g., because of the longer operational range of the first communication protocol as compared to the operational range of the second communication protocol).

Figure 4A:
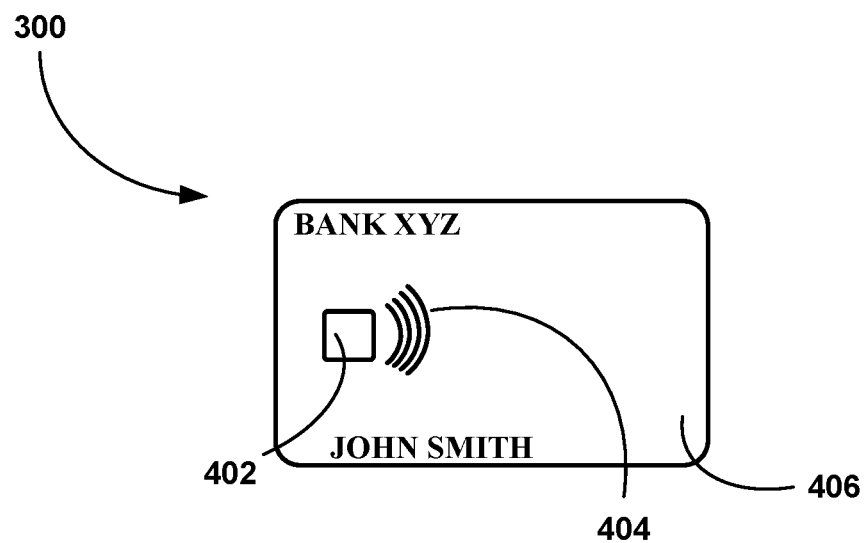
FIG. 4A is a conceptual diagram illustrating a contactless card in accordance with the techniques of this disclosure.

In some examples, the internal card readers in the cardholder sleeve are contactless card readers configured to perform NFC communication or other short-range communication with to the IC embedded in the contact card (e.g., IC chip 402 of card 300 in FIG. 4A). In some examples, the internal card readers in the cardholder sleeve are contact card readers configured to come in contact with a pattern of metal contacts on the contact card (e.g., contact pads 422 of card 450 in FIG. 4B) to electronically couple the card reader to the IC embedded in the contact card (e.g., IC chip 412 of card 450 in FIG. 4B). In this way, a cardholder sleeve and a computing device in accordance with techniques of this disclosure may enable information read from contact card to be wireless communicated with an external card reader, essentially enabling the contact card to be used as a contactless card without having to remove the contact card from the sleeve.

In some examples, the cardholder sleeve may further include a battery and/or one or more user interface devices. In some examples, the battery may be a rechargeable battery. The one or more user interface devices may comprise a button, switch, or any other input device that may receive user input for activating the internal card reader and/or the wireless transceiver. For example, the cardholder sleeve may only read information from the IC chip embedded in a card and/or pair with the computing device when the one or more UI devices are activated/enabled.

In operation, when the computing device is held near the POS device or external card reader, NFC interrogation occurs with the computing device acting as a proxy for the payment card held in the cardholder sleeve. For example, in response to receiving interrogating signals from the POS device or external card reader, the computing device sends a request to the cardholder sleeve for information associated with the IC chip card held in the cardholder sleeve. In response to receiving the request for information, the internal card reader of the cardholder sleeve reads the information stored on the IC chip of the card and transmits the information back to the computing device. The computing device then responds to the POS device or external card reader by sending the information associated with the IC chip card to the POS device or external card reader. In this way, the sleeve and computing device form a repeater network that enables the IC chip card to essentially be interrogated remotely by the POS device or external card reader.

In some examples, malicious third parties may attempt to use the remotely activatable nature of a contactless card to covertly activate and steal the information of the card. For example, a malicious third party may stand near a busy intersection with an NFC enabled device configured to remotely activate any cards that come within a vicinity of the device, pulling in and storing any data from the cards of passersby. Such activity is called "card skimming." Malicious third parties may attempt to steal data of a card with the hopes of fraudulently using this information to execute future illicit transactions or to gain access to an area that requires particular access rights. In certain examples, the one or more pockets to hold one or more IC chip cards may include embedded shielding material to block interrogating signals (including malicious skimming signals). In this way, the cardholder sleeve may impede or eliminate the ability of a malicious third party to steal data from one or more contactless cards within the cardholder sleeve.

FIG. 1 is a block diagram illustrating a system 101 that includes a cardholder sleeve 114 a computing device 120 paired with cardholder sleeve 114 configured to operate as NFC proxy devices for one or more IC chip cards held in cardholder sleeve 114 to communicate with external card reader 130. Cardholder sleeve 114 may comprise one or more pockets to hold one or more IC chip cards (not shown in FIG. 1). System 101 further includes an external card reader 130 and a server 138 configured to communicate with external card reader 130 over network 140 (e.g., the Internet). In some examples, server 138 is associated with third party system 142 that may be a financial institution (e.g., a bank), non-bank card-issuer, a merchant, a transit authority, a business, etc.

An IC chip card held within a pocket of cardholder sleeve 114 may be a credit card, debit card, access card, or some other type of card (e.g., a driver's license or student ID, a work badge, a parking card, or a hotel key card) that stores data (e.g., financial information, account information, identification information, access information) on one or more integrated circuits (ICs). IC chip cards may include a memory to store the data. IC chip cards may further include other circuitry components understood by one of ordinary skill in the art to be used to execute functions (e.g., authentication functions, encryption functions) for participating in transactions with a card reader. In some examples, IC chip card may be a contact card that may be configured to be readable by a conventional chip reader (e.g., as a result of inserting the card into the chip reader). In some examples, the IC chip card may include short-range antennas (e.g., as shown in FIG. 4A) for communicating with a card reader wirelessly (e.g., using NFC communications).

In some examples, the pocket(s) of cardholder sleeve 114 may be surrounded by or comprise shielding material to shield the communication features of IC chip card to reduce or prevent skimming and/or interference with other cards in cardholder sleeve 114. This shielding material may comprise metallic material (e.g., aluminum, tin, copper, nickel) or any other type of material or fabric that can shield or block electromagnetic radio-frequency (RF), NFC, or other wireless signals (e.g., interrogating signals from an external card reader). According to examples of this disclosure, cardholder sleeve 114 includes one or more internal card readers inside each pocket of cardholder sleeve 114 to read information from the IC chip card held within each pocket and a wireless transceiver and antenna that are configured to communicate with computing device 120 via a wireless communication protocol (e.g., Bluetooth, Wi-Fi, ZigBee).

External card reader 130 may be a device that processes transactions for a merchant, such as a point-of-sale (POS) device, or performs access determinations, such as a turnstile at a metro stop, a gate at a parking garage, a lock on a door. To process transaction or perform access determinations, external card reader 130 may transmit or broadcast interrogating signals requesting card information. For example, antenna 134 of external card reader 130 may transmit interrogating signals requesting card information. In some examples, external card reader 130 may be pseudo-continuously sending or broadcasting interrogating signals (e.g., in the case of a transit turnstile or secure access point). In certain examples, external card reader 130 only sends the interrogating signals when manually instructed to (e.g., as a result of a cashier operating external card reader 130). In some examples, external card reader 130 may work with other entities such as third-party system 142 (e.g., a payment processing entity, a credit card network, the financial institution, a security institution) to process a transaction or make an access determination. For example, server 138 may be a financial institution sever corresponding to third party system 142 (e.g., a financial institution) and external card reader 130 may communicate the received information to server 138 via network 140 to complete the transaction on behalf of third-party system 142. In another example, server 138 may be a facility management sever corresponding to third party system 142 (e.g., a security institution) and external card reader 130 may communicate the received information to server 138 via network 140 to determine whether the cardholder has proper access rights.

In operation, computing device 120 and cardholder sleeve 114 operate as NFC proxy devices for an IC chip card held in cardholder sleeve 114. For example, instead of the IC chip card receiving interrogating signals from external card reader 130, computing device 120 receives interrogating signals from the external card reader 130 when an NFC transceiver of computing device 120 is within operational range of antenna 134. In some examples, computing device 120 has a longer operational range than the IC chip card. In some examples, computing device 120 will only receive interrogating signals from external card reader 130 and/or request information from an IC chip card held in cardholder sleeve 114 if this functionality is activated via user input at a user interface (UI) device of computing device 120. In other words, computing device 120 will not request any card information from cardholder sleeve 114 unless computing device 120 is activated via the UI device. In some examples, the UI device of computing device 120 may comprise a switch, a button, a touchscreen, or any other device that may allow a user to activate communications between computing device 120 and external card reader 130 and/or cardholder sleeve 114.

In response to receiving the interrogating signals from external device 130, computing device 120 transmits a request to cardholder sleeve 114, which is paired with computing device 120, to read information from a respective IC chip card held in cardholder sleeve 114 via a wireless communication protocol (e.g., Bluetooth, Wi-Fi, ZigBee). In some examples, the request may identify the respective IC chip card and/or an internal card reader associated with respective IC chip card. In other examples, the request may simply comprise an instruction to read information from the IC chip card held within cardholder sleeve 114 (e.g., when the cardholder sleeve is configured to hold a single IC chip card). In other examples, the request may simply comprise an instruction to read information from the IC chip card corresponding to an internal card reader within cardholder sleeve 114 that is manually selected by a user. In response to receiving the request for information from computing device 120, cardholder sleeve 114 may activate an internal card reader to read information from the respective IC chip card (e.g., when the cardholder sleeve is configured to hold a single IC chip card). In other examples, cardholder sleeve 114 may activate the internal card reader associated with the respective IC chip card identified in the request. In other examples, cardholder sleeve 114 may activate the internal card reader that is manually selected by a user. The activated internal card reader will power the IC chip and read the requested information from the IC chip (e.g., through the pattern of metal contacts or NFC communications with the IC chip). Cardholder sleeve 114 will then transmit the information read from IC chip card to computing device 120 via the wireless communication protocol (e.g., Bluetooth, Wi-Fi, ZigBee). In some examples, cardholder sleeve 114 may include one or more user interface devices for activating communication with computing device 120. For example, if cardholder sleeve 114 is not active (e.g., via a user interface device of sleeve 114), no internal card reader will be activated, no information will be read from any card, and no information will be transmitted. Reading and transmitting card information only when the cardholder sleeve 114 is activated may reduce or eliminate the ability of malicious parties to execute fraudulent transactions using data gathered by card skimming of any IC chip card held in cardholder sleeve 114 as described herein.

In response to receiving the card information from cardholder sleeve 114, computing device 120 will transmit (i.e., repeat) the card information to external card reader 130. In some examples, the card information read from the IC chip card held in cardholder sleeve 114 may include information such as account number, employee ID, a name, phone number, email address, rewards program number, or any other information that can be stored in an IC chip.

In some examples, card information received by computing device 120 from cardholder sleeve 114 may be encrypted. In order to make use of the received encrypted data, computing device 120 may decrypt the received encrypted data and transmit the decrypted card information back to external card reader 130 to perform authentication or authorization operations with the decrypted card information. Computing device 120 may decrypt the encrypted data received from cardholder sleeve 114 by any technique known to one skilled in the art. For example, computing device 120 may use a predetermined cipher (e.g., a private key) to decrypt the encrypted data received from cardholder sleeve 114.

In response to receiving the card information from computing device 120 at antenna 134, controller 132 of external card reader 130 and/or server 138 may determine access rights or complete a transaction based the received information. For example, the IC chip card may be a transit card and external card reader 130 and/or server 138 may determine whether a user has access rights or sufficient funds to access a transit stop or board a transit vehicle (e.g., bus, train, subway) based on the information read from the card. In some examples, controller 132 of external card reader will extract the necessary funds from the transit card balance (or instruct server 138 to extract the funds) before granted access (e.g., unlocking a turnstile) to the transit stop or vehicle. In another example, the IC chip card may be an employee badge and controller 132 of external card reader 130 may determine whether a user has access rights to a facility, a floor, a room, or any area that received particular access rights based on the information read from the card. For example, external card reader 130 may be a terminal that is used to gain entry to a secure building or area and the information read from the IC chip card may comprise identifying information that would enable the entrance station to unlock or open a respective door to a secure building or area. In another example, external card reader 130 may be an entrance station of a parking garage located at an entrance and exit to the parking garage and the information read from the IC chip card may comprise identifying information that would enable the entrance station to raise a railing to provide the cardholder access to the parking garage. The identifying information read from the IC chip card may comprise a name, date of birth, username, employee number, or the like that is related to the cardholder. In some examples, external card reader 130 may communicate the received information to server 138 via network 140 and server 138 may determine whether the cardholder has proper access rights. In some examples, the secure building or area is associated with (e.g., owned or operated by) third-party system 142.

In some examples, the IC chip card may be a financial card (e.g., a debit card or a credit card) and external card reader 130 may complete a financial transaction using the received information. When the IC chip card is a financial card, the information read from that card and transmitted to external card reader 130 may include financial data to process the transaction (e.g., an account number, pin number, password, one-time passcode, or the like for a checking account used by a cardholder of the IC chip card). In some examples, external card reader 130 may work with other entities such as third-party system 142 (e.g., a payment processing entity, a credit card network, the financial institution that issued card 100) to process the transaction. For example, server 138 may be a financial institution sever corresponding to third party system 142 (e.g., a financial institution) and external card reader 130 may communicate the received information to server 138 via network 140 to complete the transaction on behalf of third-party system 142.

In some examples, external card reader 130 may be configured to accept an input from the cardholder via one or more user interface devices (not shown) (e.g., touchscreen, keypad, keyboard). For example, the input may comprise a PIN number, a password, a confirmation, an acceptance of one or more rates or options for a transaction, or any other input. In response to receiving the input from the cardholder, external card reader 130 may use the input to process the transaction or to determine access rights.

In some examples, controller 132 may be a software module configured to execute functions attributed to external card reader 130 herein and antenna 134 may be a three-dimensional coil or printed trace or the like that is configured to send and receive electromagnetic or other wireless signals as discussed herein. External card reader 130 may include a processor and a memory (not shown), where the memory stores instructions relating to the functions attributed to external card reader 130 (e.g., such that the memory stores controller 132) and the processor executes the functions (e.g., executes the actions of controller 132). In some examples, external card reader 130 may include a display or other output devices.

In some examples, both controller 132 and antenna 134 may be within a single housing of external card reader 130, whereas in other examples antenna 134 may be in one or more physically separate housings that are physically or wirelessly connected to external card reader 130 to communicate with controller 132. External card reader 130 may include a cluster of one or more computers, workstations, servers, and the like. For example, a first server may host controller 132 while a separate computer includes antenna 134 and other components that are necessary to execute transactions at a storefront of the merchant or to grant access to an area that requires particular access rights.

Figure 2:
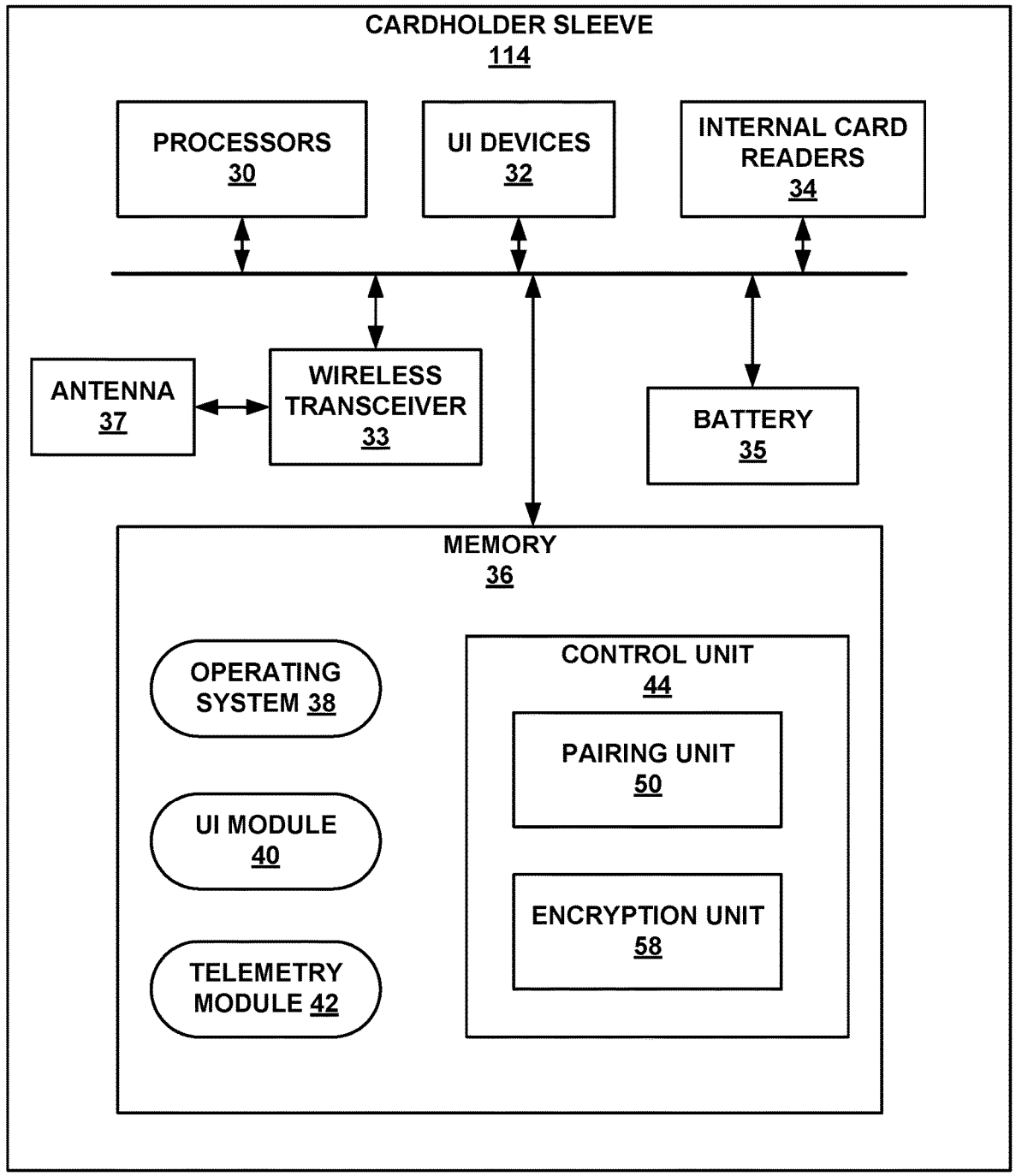
FIG. 2 is a block diagram illustrating an example cardholder sleeve in accordance with the techniques of this disclosure.

FIG. 2 is a block diagram illustrating an example cardholder sleeve 114 in accordance with the techniques of this disclosure. The architecture of cardholder sleeve 114 illustrated in FIG. 2 is shown for exemplary purposes only and cardholder sleeve 114 should not be limited to this architecture. In other examples, cardholder sleeve 114 may be configured in a variety of ways.

As shown in the example of FIG. 2, cardholder sleeve 114 includes one or more processors 30, one or more UI devices 32, wireless transceiver 33, antenna 37, one or more internal card readers 34, battery 35, and one or more memory units 36. Memory 36 of cardholder sleeve 114 includes operating system 38, UI module 40, telemetry module 42, and control unit 44, which are executable by processors 30. Each of the components, units or modules of cardholder sleeve 114 are coupled (physically, communicatively, and/or operatively) using communication channels for inter-component communications. In some examples, the communication channels may include a system bus, a network connection, an inter-process communication data structure, or any other method for communicating data.

Processors 30, in one example, may comprise one or more processors that are configured to implement functionality and/or process instructions for execution within cardholder sleeve 114. For example, processors 30 may be capable of processing instructions stored by memory 36. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 36 may be configured to store information within cardholder sleeve 114 during operation. Memory 36 may include a computer-readable storage medium or computer-readable storage device. In some examples, memory 36 includes one or more of a short-term memory or a long-term memory. Memory 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 36 is used to store program instructions for execution by processors 30. Memory 36 may be used by software or applications running on cardholder sleeve 114 (e.g., control unit 44) to temporarily store information during program execution.

Cardholder sleeve 114 may utilize wireless transceiver 33 to communicate with computing device 120 via antenna 37. Wireless transceiver 33 may be a Bluetooth transceiver, Wi-Fi transceiver, NFC transceiver, optical transceiver, radio frequency (RF) transceiver, or any other type of transceiver that can send and receive information wirelessly. In some examples, cardholder sleeve 114 utilizes wireless transceiver 33 to wirelessly communicate with computing device 120 via antenna 37. Wireless transceiver 33 may be controlled by telemetry module 42.

UI devices 32 may be configured to operate as both input devices and output devices. For example, UI devices 32 may be a button, a switch, touchscreen, or any other input device that may receive user input. UI devices 32 may be configured to receive tactile, audio, or visual input from a user of cardholder sleeve 114. In addition to receiving input from a user, UI devices 32 may be configured to provide output to a user using tactile, audio, or video stimuli. In one example, UI devices 32 may be configured to output content such as a GUI for display at a display device. UI devices 32 may include a presence-sensitive display that displays a GUI and receives input from a user using capacitive, inductive, and/or optical detection at or near the presence sensitive display.

Cardholder sleeve 114 may further include one or more internal card readers 34 positioned adjacent to each pocket of the cardholder sleeve 114. Each of internal card readers 34 may be configured to read information from an IC chip embedded within a card. In some examples, internal card reader 34 may be positioned such that they come in contact with the IC chips of the one or more card held in the cardholder sleeve 114. In other examples, internal card reader 34 may be positioned such that they do not come in contact with the IC chip of card (e.g., allow air or material to be in between each of internal card reader 34 and each card). In some examples, one or more internal card reader 34 may comprise contactless card readers (e.g., may communicate with the IC chip cards through NFC communications) and one or more internal card reader 34 may comprise contact card readers (e.g., may be configured to contact patterns of metal contacts on an IC chip card to read information of that card).

Battery 35 may be used to power cardholder sleeve 114. For example, battery 35 may power processors 30, UI devices 32, wireless transceiver 33, antenna 37, internal card reader 34 and/or any other components of cardholder sleeve 114. In some examples, battery 35 may be a rechargeable battery and/or be a solar battery.

Operating system 38 controls the operation of components of cardholder sleeve 114. For example, operating system 38, in one example, facilitates the communication of UI module 40, telemetry module 42, and control unit 44 with processors 30, UI devices 32, wireless transceiver 33, and memory 36. Operating system 38, UI module 40, telemetry module 42, and control unit 44 may each include program instructions and/or data stored in memory 36 that are executable by processors 30. As one example, control unit 44 may include instructions that cause cardholder sleeve 114 to perform one or more of the techniques described in this disclosure.

Cardholder sleeve 114 may include additional components that, for clarity, are not shown in FIG. 2. Similarly, the components of cardholder sleeve 114 shown in FIG. 2 may not be necessary in every example of cardholder sleeve 114.

In the example illustrated in FIG. 2, control unit 44 includes a pairing unit 50 and encryption unit 58. Pairing unit 50 of control unit 44 may be configured to establish a pairing between cardholder sleeve 114 and computing device 120 by initiating communication with computing device 120 via wireless transceiver 33 and antenna 37. For example, pairing unit 50 may communicate with computing device 120 via antenna 37 using a wireless communication protocol when computing device 120 is within a certain distance, e.g., less than 100 m in the case of Bluetooth. Pairing unit 50 may exchange some information with computing device 120 to establish the pairing, such as identification information and/or communication capabilities. In addition, pairing unit 50 may periodically send "keepalive" messages to computing device 120 to maintain the pairing. Based on this pairing, cardholder sleeve 114 recognizes and communicates with computing device 120 whenever computing device 120 is within range for the wireless communication protocol. In some examples, a user must initially establish a pairing between cardholder sleeve 114 and computing device (e.g., via UI devices) and pairing unit 50 will maintain a record of this pairing such that pairing 50 will automatically pair cardholder sleeve 114 with computing device 120 when the two devices are within a certain distance from each other (e.g., within 100 m).

According to the techniques of this disclosure, encryption unit 58 may be configured to perform encryption and decryption functions. For example, encryption unit 58 may encrypt information read from an IC chip card with a public or private key. Encryption unit may also store and manage public and/or private keys for encryption and decryption functions.

In operation, wireless transceiver 33 of cardholder sleeve 114 receives a request for information (e.g., interrogating signals) from a computing device 120 paired with the cardholder sleeve 114 (e.g., via pairing unit 50). The request may be for information from a particular card held in a particular pocket of cardholder sleeve 114. In some examples, the request may include the interrogating signals received from external card reader 130. For example, the interrogating signals may be embedded into the request. In response to receiving the request for information, control unit 44 may activate the particular internal card reader of the internal card reader 34 corresponding to the particular card/pocket of cardholder sleeve 114. The activated internal card reader then powers the IC chip of the particular card, which enables the activated internal card reader to read card information from the IC chip of the card (e.g., through the pattern of metal contacts on the IC chip card or NFC communications with the IC chip of the card). For example, the activated card reader may repeat the interrogating signals received from paired computing device 120. In some examples, control unit 44 activates the particular internal card reader only in response to receiving a request from a paired computing device 120 (e.g., to help avoid skimming). In some examples, control unit 44 activates the particular internal card reader only if cardholder sleeve 114 has been activated via UI devices 32. In some examples, a user or cardholder may enter user input at UI devices 32 of cardholder sleeve 114 to select a particular card held within a pocket of the cardholder sleeve 114 and electronically couple the respective internal card reader 34 corresponding to the selected card to transceiver 33. In this way, any interrogating signals received by transceiver 33 will be transmitted to the selected card reader 34 to power the IC of the corresponding card. As described above, the UI device may comprise a switch, a button configured to toggle between internal card readers or configured to select an internal card reader, or any other user interface element that may allow a user to select an internal card reader based on the placement of a desired card in cardholder sleeve 114.

In response to reading the card information, control unit 44 of cardholder sleeve 114 then responds, via wireless transceiver 33 and antenna 37, to the request for information from computing device 120 with the card information read from the IC chip card held in the pocket. As described above, cardholder sleeve 114 may be paired with computing device 120 over a first communication protocol (e.g., Bluetooth) and the card information may be read by the internal card reader using a second communications protocol (e.g., NFC). In order to transmit the card information to computing device 120, control unit 44 may have to convert the second communication protocol signals (e.g., NFC signals) to the first communication protocol (e.g., Bluetooth) before transmitting the response back to computing device 120 via wireless transceiver 33 and antenna 37. For example, control unit 44 may extract the card information from NFC signals and embed that card information into a Bluetooth message to transmit to computing device 120. In some examples, encryption unit 58 encrypts the card information read from the IC chip card and the control unit 44 transmits, via wireless transceiver 33 and antenna 37, the encrypted card information to computing device 120.

Figure 3:
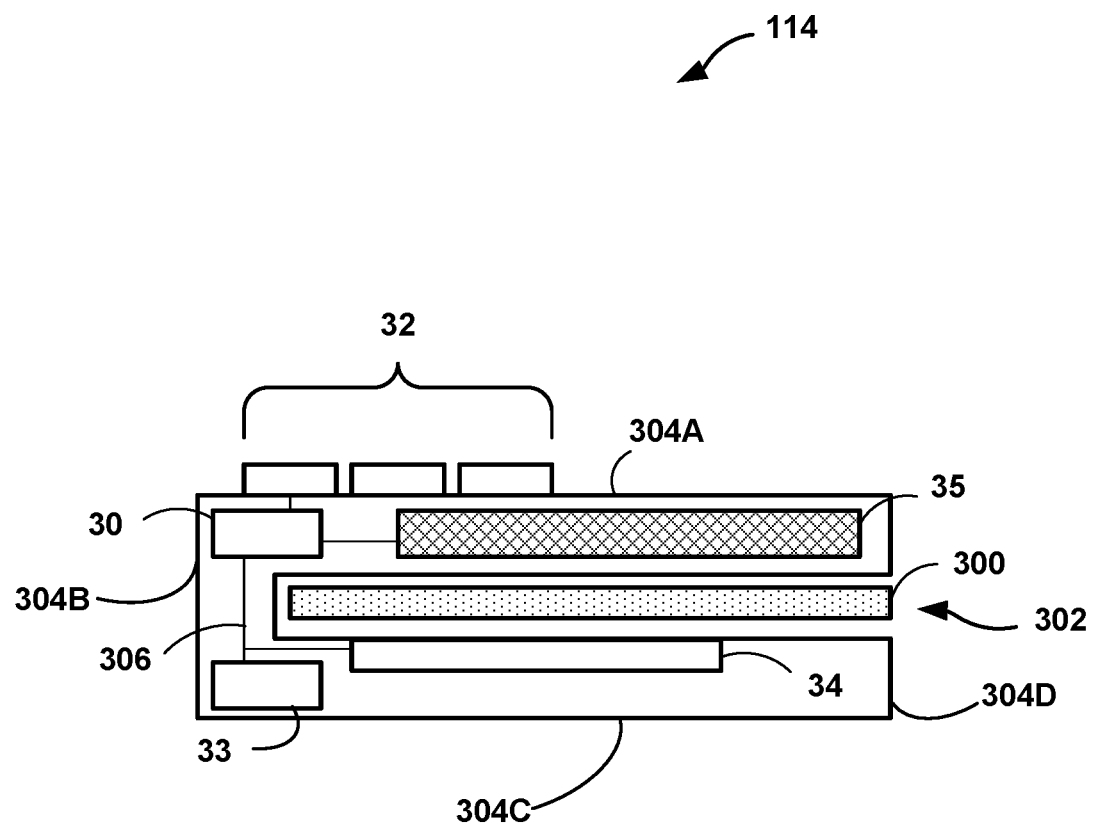
FIG. 3 is a conceptual and schematic diagram illustrating an example cardholder sleeve in accordance with the techniques of this disclosure.

FIG. 3 is a conceptual and schematic diagram illustrating an example cardholder sleeve 114 in accordance with the techniques of this disclosure. In this example, cardholder sleeve includes pocket 302 to hold IC chip card 300. While one pocket 302 is shown in FIG. 3, it is understood that cardholder sleeve 114 may include more pockets to hold more than one IC chip card 300 in accordance with techniques of this disclosure. For example, cardholder sleeve 114 may comprise a booklet with a plurality of sheets corresponding to a plurality of pockets to hold a plurality of IC chip cards. Further, while FIG. 3 illustrates an open pocket 302 on side 304D of cardholder sleeve 114, it is understood that IC chip card 300 may be enclosed on side 304 of cardholder sleeve 114 as well. Cardholder sleeve 114 may comprise soft material (e.g., leather, cloth, polyester, soft plastic, metallic fabric), rigid material (e.g., hard plastic, copper, nickel, aluminum, tin) or a combination of soft and rigid material. For example, the exterior portions of cardholder sleeve 114 may comprise a rigid material (e.g., the portions around sides 304A-304D of cardholder sleeve) and the materials comprising pocket 302 may be soft, or vice versa.

Cardholder sleeve 114 may further include internal card reader 34 positioned adjacent to pocket 302. Internal card reader 34 may be configured to read information from one or more IC chips within card 300 (e.g., IC chip 402 of FIG. 4A, IC chip 412 of FIG. 4B). As shown in FIG. 3, internal card reader 34 may be positioned such that it does not come in contact with the IC chip of card 300 (e.g., allow air or material to be in between internal card reader 34 and card 300). In other examples, internal card reader 34 may be positioned such that it comes in contact with the IC chip of card 300. In some examples, internal card reader 34 may comprise a contactless card reader (e.g., may communicate with the IC of card 300 through NFC communications). In some examples, internal card reader 34 may comprise a contact card reader (e.g., may be configured to contact patterns of metal contacts on a card to read information off of that card).

In some examples, cardholder sleeve 114 may include shielding material around pocket 302. For example, shielding material may extend over and/or beyond the surfaces of card 300 (e.g., shielding material can be embedded on sides 304A, 304B, 304C, and 304D of cardholder sleeve 114 to completely surround all sides of card 300). In some examples, shielding material may extend over and/or beyond the areas over the IC chip of card 300 but not completely extend over the major surfaces of card 300. The shielding material may comprise metallic material (e.g., aluminum, tin, copper, nickel) or any other type of material or fabric that can shield or block electromagnetic RF, NFC, or other wireless signals (e.g., interrogating signals from an external card reader). In some examples, cardholder sleeve 114 may be composed of a shielding material.

Cardholder sleeve 114 may further include one or more processors 30 that are configured to implement functionality and/or process instructions for execution within cardholder sleeve 114. For example, processors 30 may be capable of processing instructions stored by memory 36 of FIG. 2. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Cardholder sleeve 114 may further include wireless transceiver 33 and an antenna (not shown) that operate as a repeater to transmit information read by internal card reader 34 from card 300. Cardholder sleeve 114 also includes UI devices 32 that enable a user or cardholder to activate the cardholder sleeve for use (e.g., to activate internal card reader 34 and/or wireless transceiver 33). In some examples, wireless transceiver 33 may receive and transmit information with computing device 120 and/or pair with computing device 120 only when the cardholder sleeve 114 is activated via UI deices 32. The components of cardholder sleeve may be electronically coupled via connectors 306 (e.g., conductive traces, wires, cables, system bus).

Cardholder sleeve 114 may further include battery 35 to power cardholder sleeve 114. For example, battery 35 may power processors 30, UI devices 32, wireless transceiver 33, internal card reader 34 and/or any other components of cardholder sleeve 114. In some examples, battery 35 may be a rechargeable battery and/or be a solar battery.

In operation, a user or cardholder may enter user input at UI devices 32 of cardholder sleeve 114 to activate (e.g., power on, enable) the cardholder sleeve 114. In response to receiving user input at UI devices 32 activating cardholder sleeve 114, cardholder sleeve 114 may pair with computing device 120 (e.g., automatically or the user may manually pair the sleeve with the computing device 120 via UI devices). In some examples, cardholder sleeve 114 and computing device 120 may already be paired before a user activates cardholder sleeve 114 via UI devices 32. Once cardholder sleeve 114 is activated, wireless transceiver 33 may receive a request for information (e.g., interrogating signals) from a computing device 120 (e.g., via an antenna). The request may be for information from card 300 held in pocket 302 of cardholder sleeve 114. In response to receiving the request for information, cardholder sleeve 114 may activate internal card reader 34, which then powers the IC chip of card 300 to read card information from the IC chip of card 300 (e.g., through the pattern of metal contacts on card 300 or NFC communications with the IC chip of card 300). For example, internal card reader 34 may repeat the interrogating signals received from paired computing device 120. In some examples, a user or cardholder may enter user input at UI devices 32 of cardholder sleeve 114 to activate the cardholder sleeve 114 (e.g., enable card information to be read information from card 300) and electronically couple the internal card reader 34 to transceiver 33. In this way, any interrogating signals received by transceiver 33 will be transmitted to the card reader 34 to power the IC of card 300.

In response to reading the card information, cardholder sleeve 114 then responds, via wireless transceiver 33 and an antenna, to the request for information from computing device 120 with the card information read from card 300 held in pocket 302. As described above, cardholder sleeve 114 may be paired with computing device 120 over a first communication protocol (e.g., Bluetooth) and the card information may be read by the internal card reader using a second communications protocol (e.g., NFC). In order to transmit the card information to computing device 120, cardholder sleeve 114 may have to convert the second communication protocol signals (e.g., NFC signals) to the first communication protocol (e.g., Bluetooth) before transmitting the response back to computing device 120 via wireless transceiver 33 and antenna 37. For example, control unit 44 may extract the card information from NFC signals and embed that card information into a Bluetooth message to transmit to computing device 120.

Reading card information only when cardholder sleeve 114 is activated and transmitting the card information only to paired computing devices 120 may reduce or eliminate the ability of malicious parties to execute fraudulent transactions using data gathered by card skimming. In some examples, cardholder sleeve 114 encrypts the information read from card 300 and transmits the encrypted card information to computing device 120 (e.g., as described above with reference to FIG. 2), which may further reduce card skimming.

FIG. 4A is a conceptual diagram illustrating a contactless card 300 in accordance with the techniques of this disclosure. Card 300 may include one or more ICs 402 and one or more antennas 404, and may correspond to card 300 of FIG. 3. It is to be understood that antennas 404 are depicted using signal lines on front major surface 406 of card 300 for purposes of illustration only, and that antennas 404 may comprise any shape and size configured to function as described herein. For example, one or more antennas 404 may be incorporated into one or more IC chips 402. One or more antennas 404 may be short-range or long-range antennas that can perform NFC communications with a card reader when the one or more antennas 404 are in proximity to or tapped on the card reader. In some examples, antennas 404 may be radio frequency (RF) antennas, such that card 300 is an NFC card or a radio frequency identification (RFID) card. Card 300 may not include a battery or other power source for IC 402 or antennas 404. Instead, card 300 may be powered by electromagnetic fields created by interrogating signals that are received by one or more antennas 404. When powered by the received interrogating signals, IC 402 may send reply signals containing certain information of the memory of IC 402 using the one or more antennas 404 in order for an external card reader to execute a transaction, as described above with reference to FIG. 1.

Card 300 may be a credit card, debit card, access card, or any other type of card (e.g., a driver's license or student ID, a work badge, a parking card, or a hotel key card) that stores a data (e.g., financial information, account information, identification information, access information) on one or more ICs 402. The data stored on the one or more ICs 402 may include information related to a cardholder of card 300 (e.g., identifying information), such as a name, username, telephone number, email address, identification number (e.g., driver's license number, student identification number, work identification number, employee number), or the like. The stored information may include unique financial information about the cardholder, such as an account number, routing number, passcode, PIN, password, account balance, or the like that identifies a financial account of the cardholder at a financial institution (e.g., the financial institution that issues card 300). The major surface of card 300 (e.g., surface 406) may be made of any material, such as polymer (e.g., polyvinyl chloride acetate), carbon fiber, or some combination of these or other materials. Though card 300 is depicted with one IC 402 for purposes of illustration, in other examples card 300 may have two or more ICs 402. IC 402 may include a memory to store the data. IC 402 may further include other circuitry components understood by one of ordinary skill in the art to be used to execute the functions (e.g., authentication functions, encryption functions).

Figure 4B:
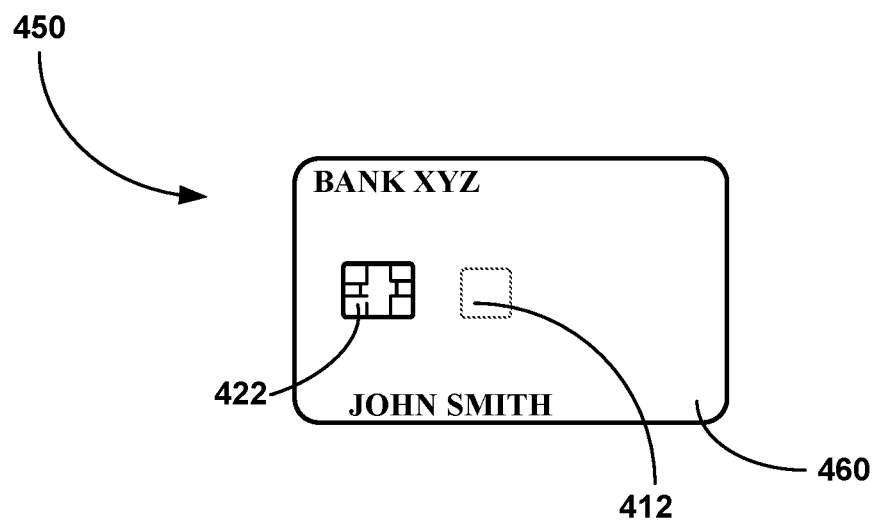
FIG. 4B is a conceptual diagram illustrating a contact card in accordance with the techniques of this disclosure.

FIG. 4B depicts a contact card 450 in accordance with the techniques of this disclosure. Card 450 may include one or more ICs 412 and one or more contact pads 422, and may correspond to card 300 of FIG. 3. It is to be understood that contact pads 422 are depicted separate from ICs 412 for purposes of illustration only, and that contact pads 422 and ICs 412 may be combined into one IC chip and configured to function as described herein. For example, one or more contact pads 422 may be incorporated into one or more of IC chips 412 such that the one or more IC chips 412 includes the one or more contact pads 422. In some examples, the one or more contact pads 422 are a pattern of metal contacts to electronically connect (e.g., couple) a card reader to the one or more IC chips 412 when contact card 450 is physically inserted or dipped into the card reader. IC 412 of card 450 may be powered by a card reader when inserted or dipped into the card reader to read information off of the memory of IC 412.

Like card 300, card 450 may be a credit card, debit card, access card, or any other type of card (e.g., a driver's license or student ID, a work badge, a parking card, or a hotel key card) that stores data (e.g., financial information, account information, identification information, access information) on one or more ICs 412. The data stored on the one or more ICs 412 may include any of the information stored on IC 402 of card 300. The major surface of card 450 (e.g., surface 460) may be made of any material, such as polymer (e.g., polyvinyl chloride acetate), carbon fiber, or some combination of these or other materials. Though card 450 is depicted with one IC 412 for purposes of illustration, in other examples card 450 may have two or more ICs 412. IC 412 may further include a memory to store the data or any other circuitry components understood by one of ordinary skill in the art to be used to execute functions (e.g., authentication functions, encryption functions) for participating in transactions with a card reader.

Figure 5:
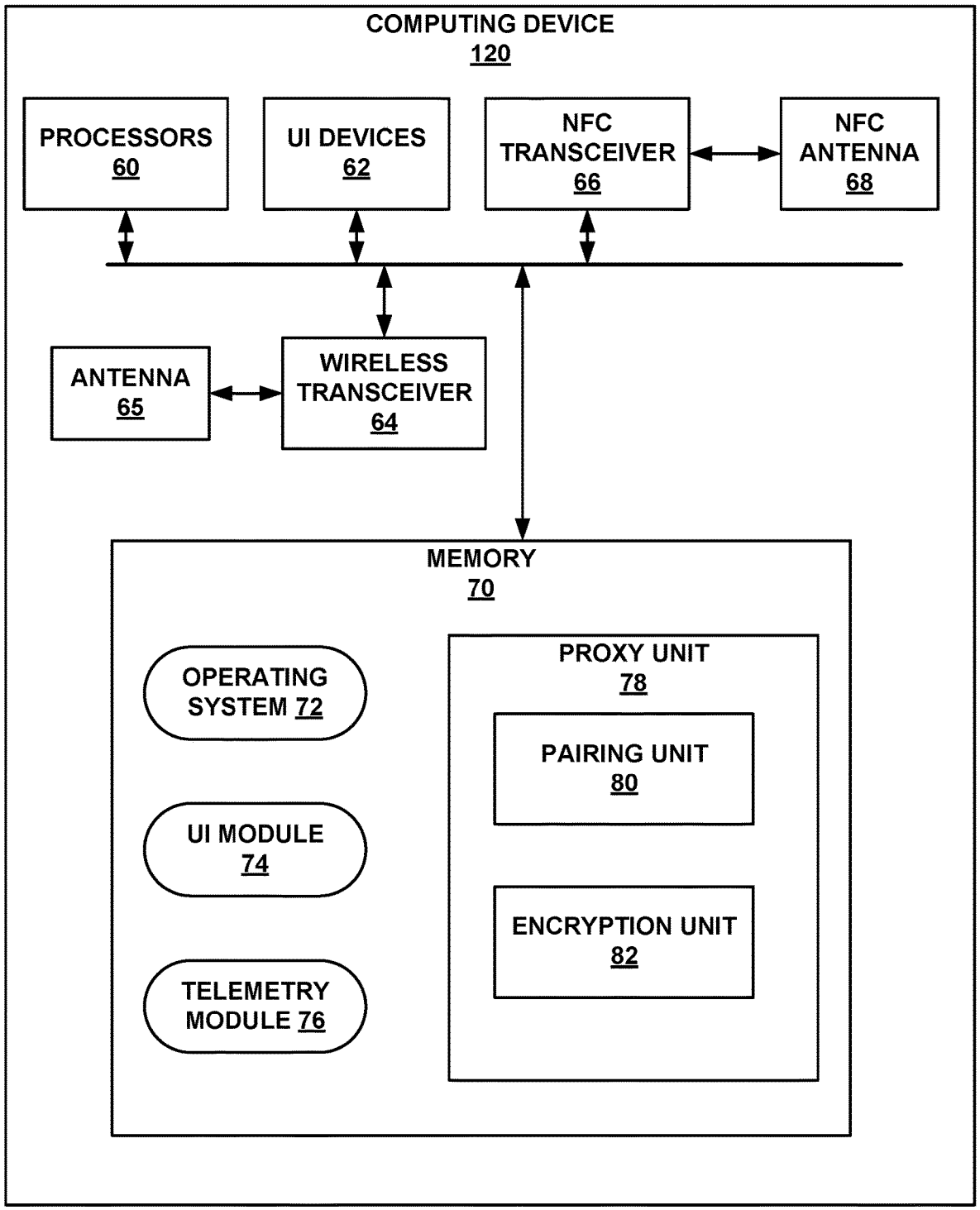
FIG. 5 is a block diagram illustrating an example computing device configured to pair with the cardholder sleeve in accordance with the techniques of this disclosure.

FIG. 5 is a block diagram illustrating an example computing device 120 configured to pair with cardholder sleeve 114 in accordance with the techniques of this disclosure. The architecture of computing device 120 illustrated in FIG. 5 is shown for exemplary purposes only and computing device 120 should not be limited to this architecture. In other examples, computing device 120 may be configured in a variety of ways.

As shown in the example of FIG. 5, computing device 120 includes one or more processors 60, one or more UI devices 62, a wireless transceiver 64, antenna 65, an NFC transceiver 66, NFC antenna 68, and one or more memory units 70. Memory 70 of computing device 120 includes operating system 72, UI module 74, telemetry module 76, and proxy unit 78, which are executable by processors 60. Each of the components, units or modules of computing device 120 are coupled (physically, communicatively, and/or operatively) using communication channels for inter-component communications. In some examples, the communication channels may include a system bus, a network connection, an inter-process communication data structure, or any other method for communicating data.

Processors 60, in one example, may comprise one or more processors that are configured to implement functionality and/or process instructions for execution within computing device 120. For example, processors 60 may be capable of processing instructions stored by memory 70. Processors 60 may include, for example, microprocessors, DSPs, ASICs, FPGAs, or equivalent discrete or integrated logic circuitry, or a combination of any of the foregoing devices or circuitry.

Memory 70 may be configured to store information within computing device 120 during operation. Memory 70 may include a computer-readable storage medium or computer-readable storage device. In some examples, memory 70 includes one or more of a short-term memory or a long-term memory. Memory 70 may include, for example, RAM, DRAM, SRAM, magnetic discs, optical discs, flash memories, or forms of EPROM or EEPROM. In some examples, memory 70 is used to store program instructions for execution by processors 60. Memory 70 may be used by software or applications running on computing device 120 (e.g., proxy unit 78) to temporarily store information during program execution.

Computing device 120 may utilize wireless transceiver 64 and antenna 65 to communicate with cardholder sleeve 114 over a first communication protocol. For example, wireless transceiver 64 may be a Bluetooth transceiver, Wi-Fi transceiver, NFC transceiver, optical transceiver, radio frequency (RF) transceiver, or any other type of transceiver that can send and receive information wirelessly. In some examples, computing device 120 utilizes wireless transceiver 66 and antenna 68 to wirelessly communicate with external card reader 130 over a second communication protocol (e.g., NFC). Wireless transceivers 64 and 66 may be controlled by telemetry module 76.

UI devices 62 may be configured to operate as both input devices and output devices. For example, UI devices 62 may be a button, a switch, touchscreen, or any other input device that may receive user input. UI devices 62 may be configured to receive tactile, audio, or visual input from a user of computing device 120. In addition to receiving input from a user, UI devices 62 may be configured to provide output to a user using tactile, audio, or video stimuli. In one example, UI devices 62 may be configured to output content such as a GUI for display at a display device. UI devices 62 may include a presence-sensitive display that displays a GUI and receives input from a user using capacitive, inductive, and/or optical detection at or near the presence sensitive display. Other examples of UI devices 62 include a voice responsive system, video camera, microphone or any other type of device for detecting a command from a user, or a sound card, a video graphics adapter card, or any other type of device for converting a signal into an appropriate form understandable to humans or machines. Additional examples UI devices 62 include a speaker, a CRT monitor, a LCD, OLED, or any other type of device that can generate intelligible output to a user.

Operating system 72 controls the operation of components of computing device 120. For example, operating system 72, in one example, facilitates the communication of UI module 74, telemetry module 76, and proxy unit 78 with processors 60, UI devices 62, wireless transceiver 64, antenna 65, NFC transceiver 66, NFC antenna 68, and memory 70. UI module 74, telemetry module 76, and proxy unit 78 may each include program instructions and/or data stored in memory 70 that are executable by processors 60. As one example, proxy unit 78 may include instructions that cause computing device 120 to perform one or more of the techniques described in this disclosure.

Computing device 120 may include additional components that, for clarity, are not shown in FIG. 5. For example, computing device 120 may include a battery to provide power to the components of computing device 120. Similarly, the components of computing device 120 shown in FIG. 5 may not be necessary in every example of computing device 120.

In some examples, computing device 120 may be a wearable device such as a ring, a watch, a bracelet, an electronic tattoo, etc. Computing device 120 may also be a mobile device such as a smart phone, tablet, smart watch, or any other hand-held device. In some examples, computing device 120 may be a generic chip card that holds no information of its own.

In the example illustrated in FIG. 5, control unit 44 proxy unit 78 includes a pairing unit 80 and encryption unit 82. Pairing unit 80 of proxy unit 78 may be configured to establish a pairing between cardholder sleeve 114 and computing device 120 by initiating communication with cardholder sleeve 114 via wireless transceiver 64 and antenna 65. For example, pairing unit 50 may communicate with cardholder sleeve 114 using a wireless communication protocol when computing device 120 is within a certain distance, e.g., less than 100 m in the case of Bluetooth. Pairing unit 80 may exchange some information with cardholder sleeve 114 to establish the pairing, such as identification information and/or communication capabilities. In addition, pairing unit 80 may periodically send "keepalive" messages to cardholder sleeve 114 to maintain the pairing. Based on this pairing, computing device 120 recognizes and communicates with cardholder sleeve 114 whenever cardholder sleeve 114 is within range for the wireless communication protocol. In some examples, a user must initially establish a pairing between cardholder sleeve 114 and computing device (e.g., via UI devices and/or using an online dashboard or interface via a browser or other application executed by processors 60) and pairing unit 80 may maintain a record of this pairing. Thereafter, pairing unit 80 may be configured to automatically establish a pairing between computing device 120 and cardholder sleeve 114 when computing device 120 and cardholder sleeve 114 are within a certain distance from each other (e.g., less than 100 m).

According to the techniques of this disclosure, encryption unit 82 may be configured to perform encryption and decryption functions. For example, encryption unit 82 may decrypt information received from cardholder sleeve 114 with a public or private key. Encryption unit may also store and manage public and/or private keys for encryption and decryption functions.

In operation, when the computing device 120 is held near external card reader 130 (e.g., a POS device), NFC interrogation occurs with the computing device 120 acting as a proxy for IC chip card 300 held in cardholder sleeve 114. For example, NFC transceiver 66 may receive, via NFC antenna 68, one or more interrogating signals from antenna 134 of external transceiver when NFC transceiver 66 and NFC antenna 68 are within operation range of antenna 134 of external card reader 130 from FIG. 1. In some examples, computing device 120 may have a longer range than an IC chip card. In response to receiving the one or more interrogating signals from antenna 134 of external card reader 130, wireless transceiver 64 transmits a request for information from the IC chip card to cardholder sleeve 114 via antenna 65. In some examples, the request for information may comprise the one or more interrogating signals received from external card reader 130 transmitted over a wireless protocol (e.g., Bluetooth). In some examples, the request will identify a particular card, pocket, or internal card reader within cardholder sleeve 114. Wireless transceiver 64 will then receive the information read from IC chip card 300 held in cardholder sleeve 114. In response to receiving the requested information from cardholder sleeve 114, NFC transceiver 66 responds to the one or more interrogating signals from antenna 134 of external card reader 130 with the received information via NFC antenna 68. In other examples, NFC transceiver 66 simply repeats, via NFC antenna 68, the card information received by wireless transceiver 64 to antenna 134 of external card reader 130. In this way, cardholder sleeve 114 and computing device 120 form a repeater network that enables the IC chip card 300 to essentially be interrogated remotely by external card reader 130.

In some examples, the card information received by computing device 120 from cardholder sleeve 114 may be encrypted. In order to make use of the received encrypted data, encryption unit 82 may decrypt the encrypted data received from cardholder sleeve 114 by any technique known to one skilled in the art. For example, encryption unit 82 may use a predetermined cipher (e.g., a private key) to decrypt the encrypted data received from cardholder sleeve 114. Once the card information is decrypted, computing device 120 may transmit, via NFC transceiver 66 and NFC antenna 68, the decrypted card information to external card reader 130 to perform authentication or authorization operations with the decrypted card information.

In accordance with the techniques of this disclosure, computing device 120 may receive notifications regarding the use of IC chip card 300 and/or cardholder sleeve 114 via wireless transceiver 64 and antenna 65, and output the notifications to the user via UI devices 62. For example, computing device 120 may receive a notification (e.g., from external card reader 130, from a server, from the card issuer) indicating whether a transaction using IC chip card 300 has been authorized (e.g., declined). The notification may comprise a sound, vibration, graphic, e.g., a flashing red 'X', or text notification depending on the capabilities of computing device 120. In the case where a transaction is not authorized, computing device 120 may receive an alert through registered email, text, or an application "push" notification.

Figure 6:
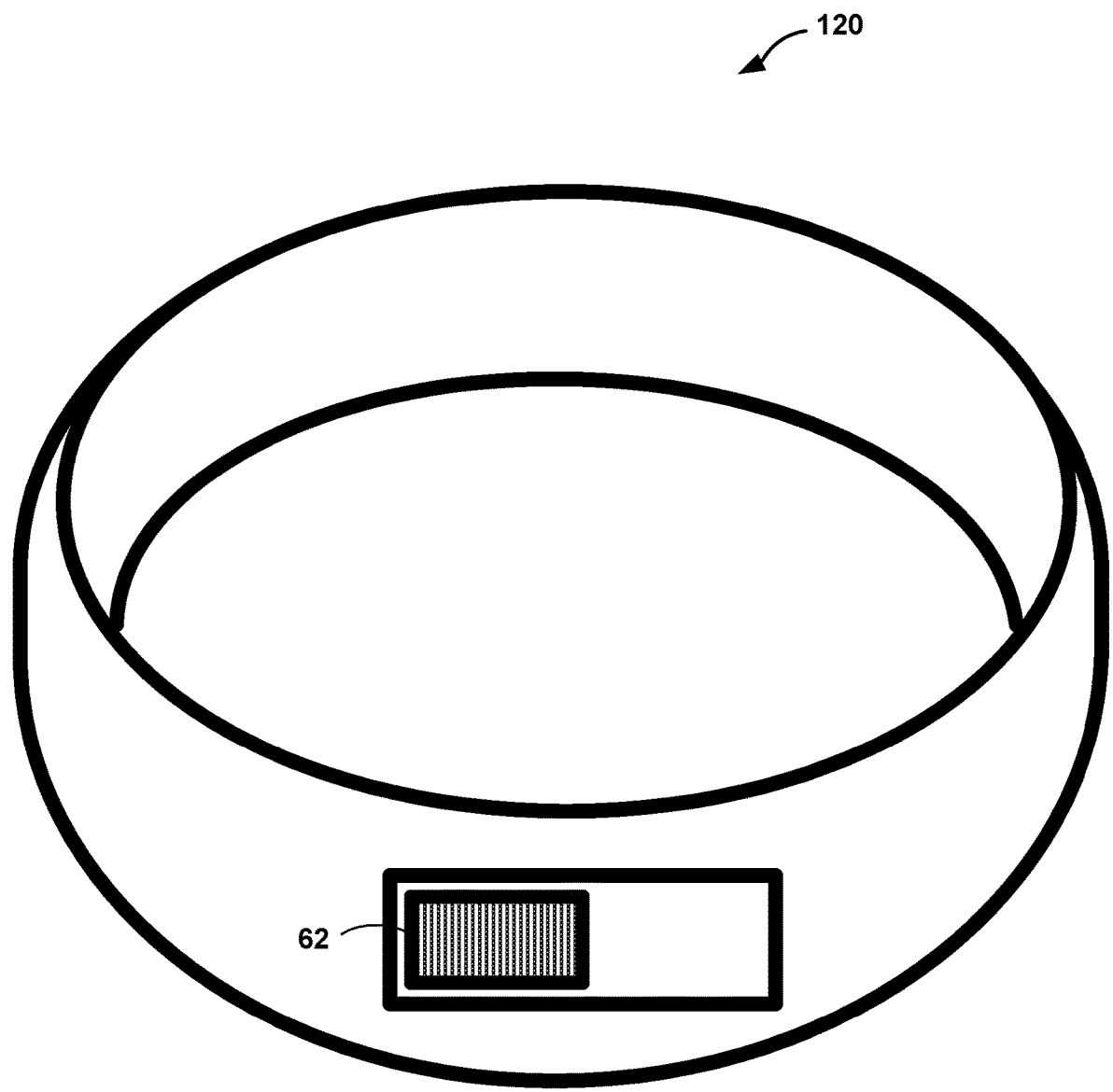
FIG. 6 is a conceptual diagram illustrating an example wearable article as the computing device configured to pair with the cardholder sleeve in accordance with the techniques of this disclosure.

FIG. 6 is a conceptual diagram illustrating an example wearable article as the computing device 120 configured to pair with the cardholder sleeve 114 in accordance with the techniques of this disclosure. In the example shown in FIG. 6, computing device 120 comprises a ring. In other examples, computing device 120 may comprise other wearable articles such as a watch, a bracelet, an electronic tattoo, etc. Computing device 120 may also comprise a mobile device such as a smart phone, tablet, smart watch, or any other hand-held device. In some examples, computing device 120 may be a generic chip card that holds no information of its own.

In the example shown in FIG. 6, wearable device 120 includes UI device 62. Specifically, UI device 62 in FIG. 6 comprises a switch. A user may "flip" switch 62 ON to activate computing device 120. Once activated, computing device 120 may communicate with cardholder sleeve 114 (e.g., via wireless transceiver 64 and antenna 65) and/or external card reader 130 (e.g., via NFC transceiver 66 and NFC antenna 68). For example, computing device 120 may only receive interrogating signals from external card reader 130 after being activated by a user via switch 62. Similarly, computing device 120 may only transmit requests for card information from cardholder sleeve 114 after being activated by a user via switch 62. In some examples, UI device 62 may be a button that must be held down to communicate with cardholder sleeve 114 (e.g., via wireless transceiver 64 and antenna 65) and/or external card reader 130 (e.g., via NFC transceiver 66 and NFC antenna 68). In this way, computing devices 120 may reduce or eliminate the ability of malicious parties to execute fraudulent transactions using data gathered by card skimming.

It should be understood that the computing device 120 shown in FIG. 6 may include the components illustrated in FIG. 5. For example, computing device 120 shown in FIG. 6 may include processors 60, wireless transceiver 64, antenna 65, NFC transceiver 66, NFC antenna 68, and memory 70. In some examples, computing device 120 may include other components. For example, computing device 120 may include a battery to provide power to the components of computing device 120.

Figure 7:
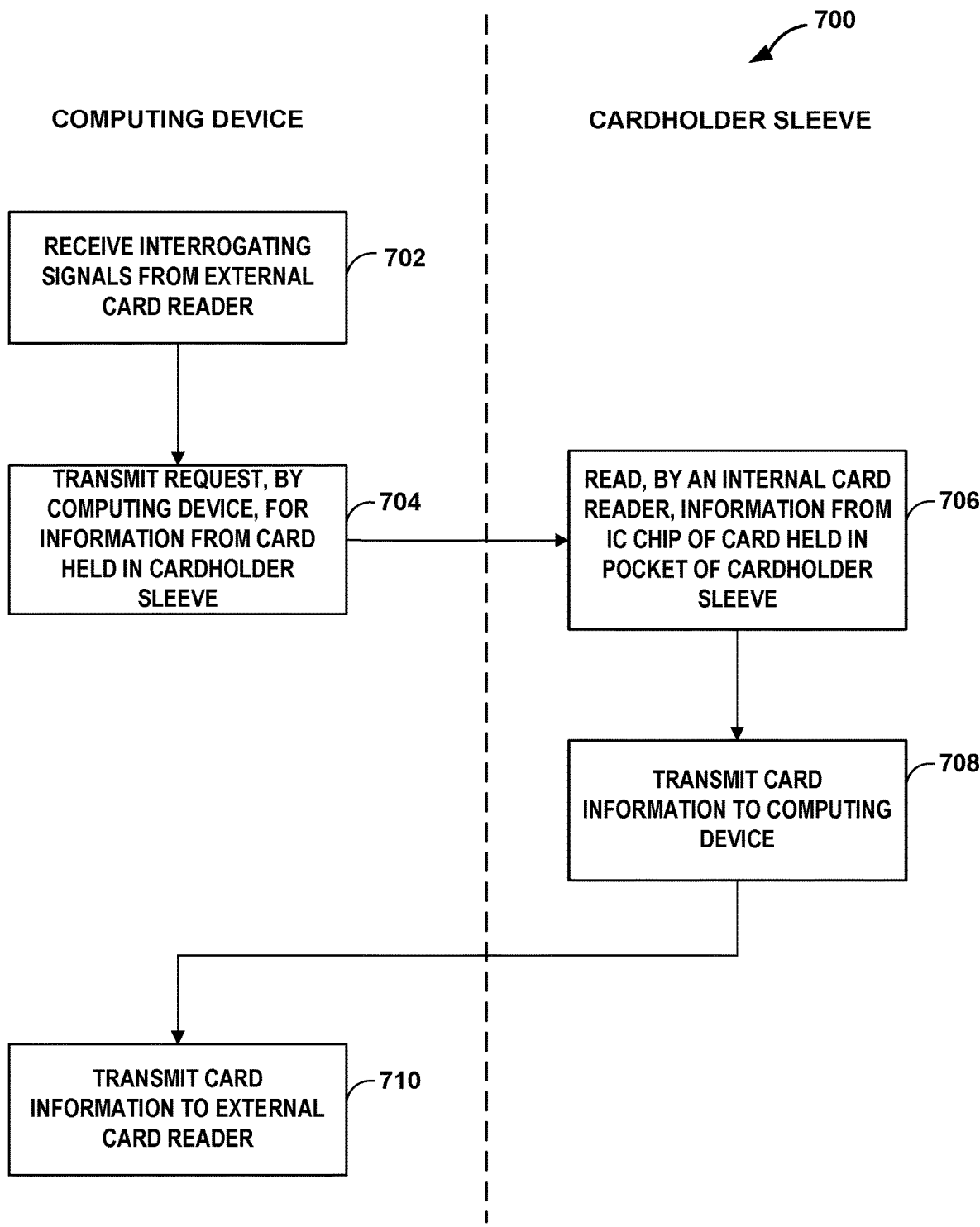
FIG. 7 is a flowchart illustrating an example method of reading and transmitting card information from a cardholder sleeve via a computing device in accordance with the techniques of this disclosure.

FIG. 7 is a flowchart 700 illustrating an example method of reading and transmitting card information from a cardholder sleeve 114 via a computing device 120 in accordance with the techniques of this disclosure.

One or more interrogating signals are received at NFC transceiver 66, via NFC antenna 68, of computing device 120 from antenna 134 of external card reader 130 (e.g., a POS device) (702). In some examples, computing device 120 may only receive the one or more interrogating signals if activated by user input via UI devices 62 (e.g., as described above with reference to FIGS. 5-6). In response to receiving the one or more interrogating signals, computing device 120 requests information from IC chip card 300 held in cardholder sleeve 114 via wireless transceiver 64 and antenna 65 (704). In some examples, the request for information may comprise the one or more interrogating signals received from external card reader 130 transmitted over a wireless protocol (e.g., Bluetooth). In some examples, computing device 120 may only request information from IC chip card 300 if computing device 120 is activated by user input via UI devices 62 (e.g., as described above with reference to FIGS. 5-6). In some examples, computing device 120 (e.g., encryption unit 82) may encrypt the request for information (e.g., as described above with reference to FIG. 5).

Wireless transceiver 33 of cardholder sleeve 114 receives the request for information (e.g., the one or more interrogating signals) from a computing device 120 via antenna 37. In response to receiving the request for information, internal card reader 34 of cardholder sleeve 114 reads card information from IC chip card 300 (e.g., through the pattern of metal contacts on the IC chip card or NFC communications with the IC chip of the card) (706). For example, internal card reader 34 may repeat the interrogating signals received from paired computing device 120. In some examples, control unit 44 activates internal card reader 34 only if cardholder sleeve 114 has been activated via UI devices 32. In response to reading the card information, control unit 44 of cardholder sleeve 114 then responds, via wireless transceiver 33 and antenna 37, to the request for information from computing device 120 with the card information read from the IC chip card held in the pocket (708). As described above, cardholder sleeve 114 may be paired with computing device 120 over a first communication protocol (e.g., Bluetooth) and the card information may be read by the internal card reader using a second communication protocol (e.g., NFC). In order to transmit the card information to computing device 120, cardholder sleeve 114 may convert the second communication protocol signals (e.g., NFC signals) to the first communications protocol (e.g., Bluetooth) before transmitting the card information to computing device 120. For example, computing device may extract the card information from NFC signals and embed that card information into a Bluetooth message to transmit to computing device 120. In some examples, whether or not the request from computing device 120 was encrypted, encryption unit 58 of cardholder sleeve 114 encrypts the card information read from the IC chip card and the control unit 44 of cardholder sleeve 114 transmits, via wireless transceiver 33 and antenna 37, the encrypted card information to computing device 120.

In response to receiving the card information from cardholder sleeve 114, computing device 120 responds to the interrogating signal from the external card reader 130 with the received card information (710). In some examples, the card information received from cardholder sleeve 114 is encrypted and computing device 120 (e.g., encryption unit 82) decrypts the received encrypted card information before transmitting it to the external device 130 (e.g., as described above with reference to FIG. 5). Either way, once the card information is received, the external card reader may instantiate a transaction (e.g., with a financial institution server) or make an access determination based on the received information. Further, instantiating a transaction may include the external card reader providing relevant information to a teller, such as a name of the cardholder, identified preferences of the cardholder such as the use of paper receipts, or the like. In this way, cardholder sleeve 114 and computing device 120 form a repeater network that enables the IC chip card 300 to essentially be interrogated remotely by external card reader 130 without having to take out card 300 from cardholder sleeve 114.

Techniques of this disclosure may provide one or more technical advantages. For example, certain techniques of this disclosure may, in some instances, provide a technical solution to securing financial (e.g., debit, credit) cards and/or access (e.g., transit, employee) cards. For example, a cardholder sleeve and a computing device paired with the cardholder sleeve in accordance with the techniques of this disclosure may configured to operate as near-field communication (NFC) proxy devices for one or more integrated circuit (IC) chip cards held in the cardholder sleeve. In some examples, the cardholder sleeve may include shielding material to shield or block the communication features of cards held within the cardholder sleeve from skimming. Moreover, including internal card readers and a transceiver that can be enabled to read and transmit information from a card to an external device via a computing device allows cardholders to use a card in the cardholder sleeve without having to remove the respective card from the sleeve. Further, the transceiver of the computing device may have a longer range than antennas of contactless cards or enable wireless communication for contact cards and, thus, enhance convenience or utility for both contactless and contact cards. Further, reading the card information for each transaction may provide several advantages over using stored card information, including reduced memory requirements and enhanced security.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:
1. A system comprising:
a cardholder sleeve comprising a pocket and an internal card reader positioned adjacent to the pocket, wherein the pocket is configured to hold a card with an integrated circuit (IC) chip; and
a computing device paired with the cardholder sleeve, wherein the computing device is configured to:
receive an interrogating signal from an external card reader to perform a transaction,
in response to receiving the interrogating signal, transmit a request to the cardholder sleeve paired with the computing device for information associated with
the card held in the pocket of the cardholder sleeve,
in response to the request, receive the information
associated with the card from the cardholder sleeve,
wherein the information is read from the IC chip of
the card held in the pocket of the cardholder sleeve
by the internal card reader, and
in response to receiving the information from the
cardholder sleeve, send the information associated
with the card to the external card reader to complete
the transaction,
wherein the cardholder sleeve is further configured to
encrypt the information read from the IC chip of the
card and send the encrypted information to the computing device, and
wherein the information received from the cardholder
sleeve comprises the encrypted information, the computing device is further configured to, prior to sending
the information associated with the card to the external
card reader, decrypt the encrypted information received
from the cardholder sleeve.

2. The system of claim 1, wherein the cardholder sleeve is configured to activate the internal card reader in response to receiving the request from the computing device.

3. The system of claim 1, wherein to read the information from the IC chip of the card, the internal card reader is configured to perform near-field communication (NFC) with the IC chip of the card.

4. The system of claim 1, wherein to read the information from the IC chip of card, the internal card reader is configured to contact the IC chip of the card.

5. The system of claim 1, wherein the cardholder sleeve and the computing device are paired through a Bluetooth protocol.

6. The system of claim 1, wherein the computing device further comprises a user interface device configured to activate the computing device in response to receiving user input, wherein, when in an active state, the computing device is configured to receive and send signals.

7. The system of claim 6, wherein the user interface device comprises one of a button or a switch configured to toggle the computing device between the active state and an inactive state.

8. The system of claim 1, wherein, to encrypt the information read from the IC chip of the card, the cardholder sleeve is further configured to encrypt the information read from the IC chip of the card with a public key stored in a memory of the cardholder sleeve; and
wherein, to decrypt the encrypted information received from the cardholder sleeve, the computing device is further configured to decrypt the encrypted information received from the cardholder sleeve with a private key stored in a memory of the computing device.

9. The system of claim 1, wherein the computing device is configured to perform near-field communication (NFC) with the external card reader.

10. The system of claim 1, wherein the computing device comprises a wearable device.

11. The system of claim 1, wherein the computing device and the external card reader are configured to communicate using a short-range communication protocol, and wherein the computing device and the cardholder sleeve are configured to communicate using another communication protocol having a longer range than the short-range communication protocol.

12. A method comprising:
receiving, at computing device paired with a cardholder sleeve comprising a pocket to hold a card with an integrated circuit (IC) chip and an internal card reader positioned adjacent to the pocket, an interrogating signal from an external card reader to perform a transaction;
in response to receiving the interrogating signal, transmitting, by the computing device, a request to the cardholder sleeve for information associated with the card held in the pocket of the cardholder sleeve;
in response to the request, receiving, at the computing device, the information associated with the card from the cardholder sleeve, wherein the information is read from the IC chip of the card held in the pocket of the cardholder sleeve by the internal card reader and is encrypted by the cardholder sleeve;
in response to receiving the encrypted information from the cardholder sleeve, decrypting, by the computing device, the encrypted information received from the cardholder sleeve; and
sending, by the computing device, the decrypted information associated with the card to the external card reader to complete the transaction.

13. The method of claim 12, further comprising pairing the cardholder sleeve and the computing device through a Bluetooth protocol.

14. The method of claim 12, wherein receiving the interrogating signal comprises receiving the interrogating signal only after receiving user input, at a user device of the computing device, to activate the user device.

15. The method of claim 12, wherein receiving the interrogating signal comprises receiving the interrogating signal over a near-field communication (NFC) protocol.

16. A system comprising:
a cardholder sleeve comprising:
a pocket to hold a card with an integrated circuit (IC) chip;
an internal card reader positioned adjacent to the pocket;
an encryption unit;
a transceiver in communication with the internal card reader, wherein the transceiver is configured to receive a request for information associated with the card from a computing device paired with the cardholder sleeve over a first communication protocol,
wherein, in response to the request for information received by the transceiver, the internal card reader is activated to read the information from the IC chip of the card held in the pocket via a second communication protocol,
wherein the encryption unit is configured to encrypt the information read from the IC chip of the card held in the pocket, and
wherein the transceiver is further configured to transmit the encrypted information associated with the card to the computing device over the first communication protocol, and
a computing device paired with the cardholder sleeve, wherein the computing device is configured to: transmit a request to the cardholder sleeve for information associated with the card held in the pocket of the cardholder sleeve, and, in response to receiving the encrypted information associated with the card from the cardholder sleeve and prior to sending the information associated with the card to an external card reader, decrypt the encrypted information associated with the card received from the cardholder sleeve.

17. The system of claim 16, wherein the first communication protocol is different than the second communication protocol.

18. The system of claim 16, wherein the first communication protocol comprises a Bluetooth protocol and the second communication protocol comprises a near-field communication (NFC) protocol.

19. The system of claim 16, further comprising a user interface device configured to activate the internal card reader in response to receiving the request from the computing device, wherein, when in an active state, the internal card reader is configured to read information from the integrated ship of the card.

20. The system of claim 16, wherein the internal card reader is configured to contact the integrated chip of the card to read the information from the integrated chip.

\* \* \* \* \*